(12) United States Patent
Abbassi (10) Patent No.: US 9,707,802 B1
(45) Date of Patent: Jul. 18, 2017

(54) WHEEL ATTACHMENT SYSTEM

(71) Applicant: Saeed Abbassi, Richmond Hill (CA)

(72) Inventor: Saeed Abbassi, Richmond Hill (CA)

( * ) Notice: Subject to any disclaimer, the term of this patent is extended or adjusted under 35 U.S.C. 154(b) by 25 days.

(21) Appl. No.: 15/005,270

(22) Filed: Jan. 25, 2016

(51) Int. Cl.
*B60B 33/00* (2006.01)

(52) U.S. Cl.
CPC ...... *B60B 33/0013* (2013.01); *B60B 33/0018* (2013.01)

(58) Field of Classification Search
CPC . B60B 33/00; B60B 33/0002; B60B 33/0005; B60B 33/0007; B60B 33/0013; B60B 33/0018; B62B 5/0083; B62B 2202/12; B62B 2202/24; A45C 5/143
USPC ....................................................... 16/29, 30
See application file for complete search history.

(56) References Cited

U.S. PATENT DOCUMENTS

| | | | | |
|---|---|---|---|---|
| 1,788,150 A * | 1/1931 | Curtin | ................... | B62B 5/0083 190/18 A |
| 2,375,338 A * | 5/1945 | Alexander | ........... | A45C 13/385 190/18 A |
| 2,800,679 A * | 7/1957 | Schultz, Jr. | ......... | B60B 33/0002 16/29 |
| 2,878,028 A * | 3/1959 | Long | ..................... | B62B 5/0083 248/172 |
| 3,754,773 A * | 8/1973 | Bruno | .................. | A45C 13/385 190/18 A |
| 4,817,237 A * | 4/1989 | Murphy | .............. | B60B 33/0002 16/257 |
| 5,428,866 A * | 7/1995 | Aschow | .............. | B60B 33/0002 16/30 |
| 5,863,056 A * | 1/1999 | Hostetter | ................ | A47C 31/08 280/47.371 |
| 6,513,816 B1 * | 2/2003 | Kijima | .................. | B62B 5/0083 248/96 |
| 7,246,802 B2 * | 7/2007 | Yeung | .................. | B62D 63/064 190/108 |
| 7,614,114 B1 * | 11/2009 | Bucher | ............... | B60B 33/0002 16/29 |
| 8,302,256 B1 * | 11/2012 | Spraley | ............... | B60B 33/0005 16/30 |
| 2003/0094554 A1 * | 5/2003 | Bushey | ............... | B60B 33/0002 248/223.41 |
| 2011/0131758 A1 * | 6/2011 | Chiang | ............... | B60B 33/0002 16/18 R |

* cited by examiner

*Primary Examiner* — Roberta Delisle
(74) *Attorney, Agent, or Firm* — Nasser Ashgriz; UIpatent Inc.

(57) ABSTRACT

A holder for affixing a wheel-set with or without a strap comprising of a supporting-plate having a distal end and a proximal end, said supporting-plate having two extended L-shaped arms oppositely connect to said supporting plate from said distal and proximal ends; and a holder-means partially raised from said supporting-plate having a substantially hexagonal holder-plate to form an opening of rectangular shaped with two symmetrical grooves adapted to grip the opposite sides of a wheel-plate of said wheel-set, that can be fixed by screws, straps, adhesives or magnets to the flat surface of a moveable object of any size.

5 Claims, 10 Drawing Sheets

WHEEL ATTACHMENT SYSTEM

FIELD OF THE INVENTION

The present invention relates generally to material handling and particularly to wheeled attachments.

BACKGROUND OF THE INVENTION

Boxes, luggage, suitcases and containers with variety of shapes and sizes are used to transport goods. Carrying heavy luggage or suitcases is difficult and may cause serious injuries. Therefore, wheeled luggage are developed to make their transport easy. Wheeled luggage refers to suitcases and baggage that employ wheeling devices to allow users to roll their luggage. Wheeled luggage may have hard cases that have a plurality of wheels which add a multiple weight to the luggage. Oversized luggage does not fit in any wheeled suitcase.

Another group of devices are multi-purpose carriers that are used to aid in transportation of luggage, containers or other items. The multi-purpose carriers and carts are additional pieces that must be available to the user. Luggage and other items are placed onto the carriers, which allow wheeled transport. Some of these carriers may be rented in some transportation terminals, or they may be personal carriers that are carried and stored in addition to the luggage. These carriers are generally heavy besides lifting, loading and offloading the materials is not easy. Most of these carriers cannot be taken onto escalators, small lifts and other restricted places such as inside a plane, lavatory etc.

The prior art discloses removable wheels, which have hook and loop strips, known as Velcro strips, to attach the wheels to a luggage when needed. One section of the hook and loop strip is attached to the wheel and the matching section to a luggage. Since the hook and loop strips are generally glued to the body of the suitcase, they are not easy to remove or adjust their location.

A simple and easy-to-use detachable wheel unit with or without a strap is needed to overcome the above mentioned issues. The present invention is a wheel holder unit that can be easily attached to packaging straps provided on packaging items to combine, hold, fasten, or even reinforce these items. These straps are usually of hard materials that are sealed and can only be removed by cutting them out. The mobile wheel holder of the present invention can be easily installed on such straps without cutting them.

SUMMARY OF THE INVENTION

The present invention is a one piece wheel holder with or without a strap attachment to receive a wheel having a mounting plate, said holder comprising of a slide-rail plate to slidably receive the mounting plate of the wheel, said slide-rail plate having a first rail, a second rail, a bottom plate; a strap attaching means to attach to the strap comprising: a first L-shaped arm connected to said first rail forming a first groove between the first rail and one leg of said first arm; and a second L-shaped arm connected to said second rail forming a second groove between the second rail and one leg of said second arm, whereby the said first and second arms slide under the strap that is already tightly attached to a carryable object and the wheel slides through the guide rails at the bottom, thereby attaching the wheel holder to the flat surface or strap.

The present invention is a wheel holder with or without a strap attachment to receive a wheel having a mounting plate, said holder comprising of a first and second plate having a top side and a bottom side each; the bottom side of said first plate having a slide-rail means to slidably receive the mounting plate of the wheel; the top side of said first plate to be placed on one side of a strap, said top side having a plurality of pins for extra friction; the second plate to be placed on the other side of the strap, said plate having pin-connecting means to receive and lock in the pins of said first plate, whereby said holder can attach to a strap that is already tightly attached to a carryable object by sliding the first plate under the strap and then connect the second plate to the first plate.

The present invention is a one piece wheel holder with or without a strap attachment to receive a wheel having a mounting plate, said holder comprising of a plate having a top side and a bottom side; the bottom side of said first plate having a slide-rail means to slidably receive the mounting plate of the wheel; the plate, having strap receiving slots, whereby said holder is attached to a strap by passing the strap through said slots and then the wheel is attached to the holder through the slide rail means, whereby said holder is attached before a strap is wrapped around a carryable or moveable object.

The present invention is a detachable wheel holder unit that can be easily attached to a flat surface or to any strap, around luggage or packages, boxes and moveable items. The present wheel unit comprises of a set of wheel attached to a holder that can be attached to any flat surface or strap.

It is an object of the present invention to provide a detachable wheel unit that can be installed on any luggage with different shapes and size or on any flat surface of a carryable object.

It is another object of the present invention to provide a wheel mechanism that does not increase the size or weight of the packed items to be moved conspicuously.

It is another feature of the present invention to provide a detachable wheel unit that can be attached to any flat surface.

It is another object of the present invention to provide a detachable wheel unit that can be easily installed by travellers and other ordinary people.

It is another object of the present invention to provide a light weight wheel unit (less than 1 lb) that is convenient to carry while traveling.

Other objects, features, and advantages of the present invention will be readily appreciated from the following description. The description makes reference to the accompanying drawings, which are provided for illustration of the preferred embodiment. However, such embodiments do not represent the full scope of the present invention.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF PREFERRED EMBODIMENTS

Figures 1A, 1B:
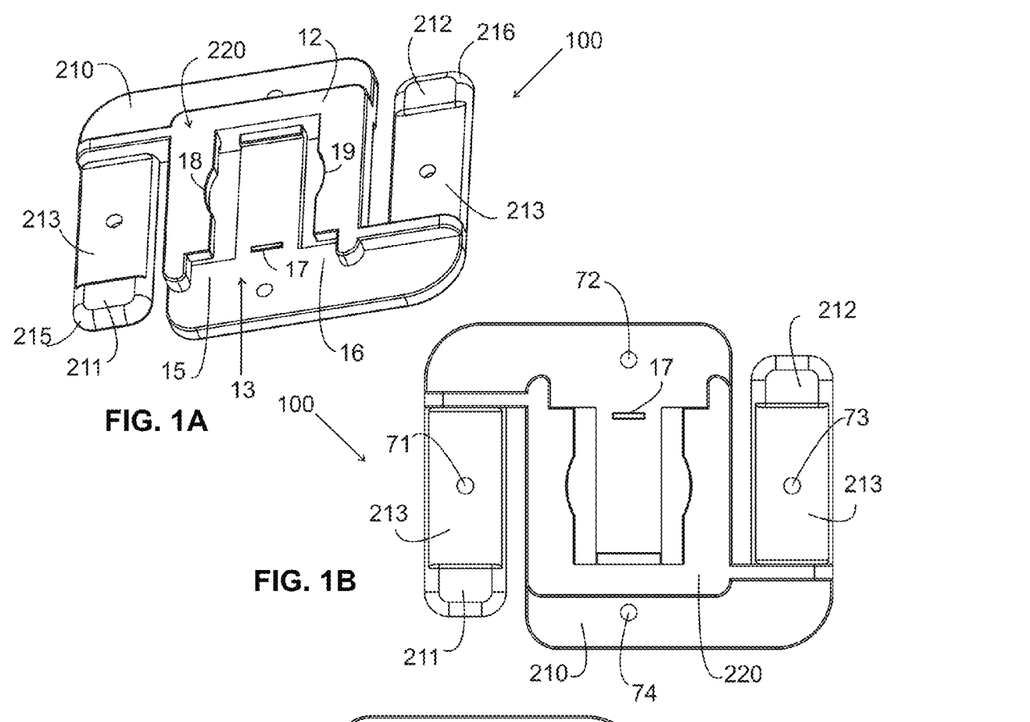
FIG. 1A shows a perspective view of the first embodiment of the present invention.
FIG. 1B shows a bottom view of the first embodiment of the present invention.
Figure 1C:
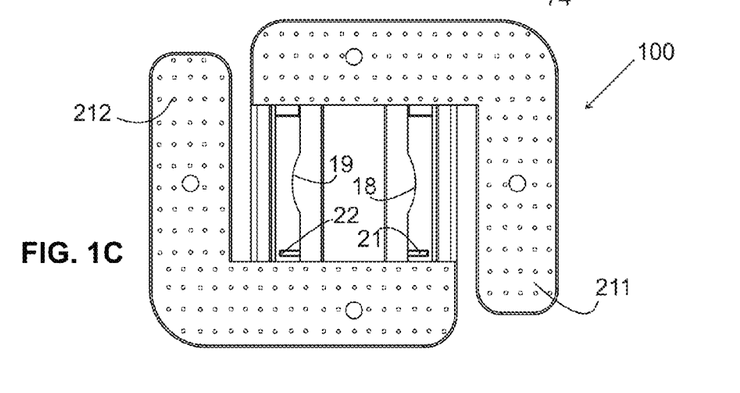
FIG. 1C shows a top view of the first embodiment of the present invention.

The first embodiment of the present invention is shown in FIGS. 1A, 1B and 1C. The coupler 100 for affixing a wheel in accordance with the first embodiment of the present invention comprises of a supporting plate 210 and a wheel attachment means 220. The coupler 100 for affixing a wheel comprises of a supporting plate 210 having two extended L-shaped arms 211-212. The two L-shaped arms are attached to the opposite sides of the supporting plate and are in the opposite direction with each other, forming two grooves between the arms and the supporting plate. Each leg having a strap-way 213 in the form of a recess. The coupler has a wheel attachment means 220 having a substantially U-shaped plate 12 with an opening 13 and having two symmetrical grooves 15-16 adapted to grip the opposite sides of a wheel-plate of a wheel. A strap passes through the strap-ways 213 and underneath of the wheel attachment means 220.

As shown in FIGS. 1A, 1B and 1C, the supporting plate 210 has a strap-way 213 to be able to compensate a strap which is wrapped around an object. The two L-shaped arms 211-212 which oppositely connect to the supporting plate 210 have steeped ends 215 and 216 can grab a strap when it is wrapped around an object.

Again as shown in FIGS. 1A and 1C, the wheel attachment means 220 further having three raised portion 17, 21 and 22 at distal end of the holder and front-top of the opening 13 to grab the opposite sides of the wheel-plate. By sliding one side of the wheel-plate into the opening 13, the raised portions 17, 21, 22 keep the wheel-plate in a proper location and prevent it from rotation or sliding out during transportation.

Figure 2A:
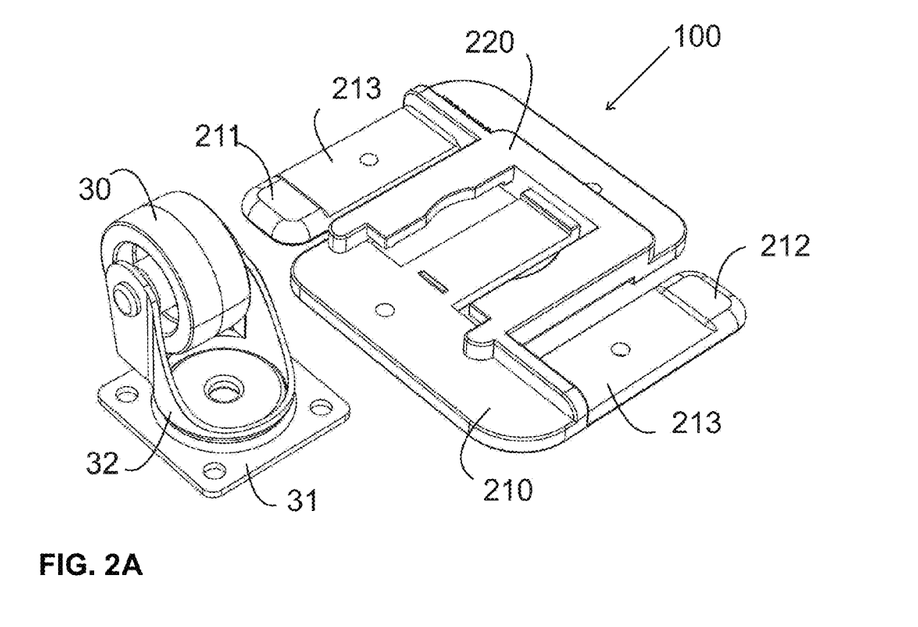
FIG. 2A shows a perspective view of the first embodiment of the present invention with a wheel set.
Figure 2B:
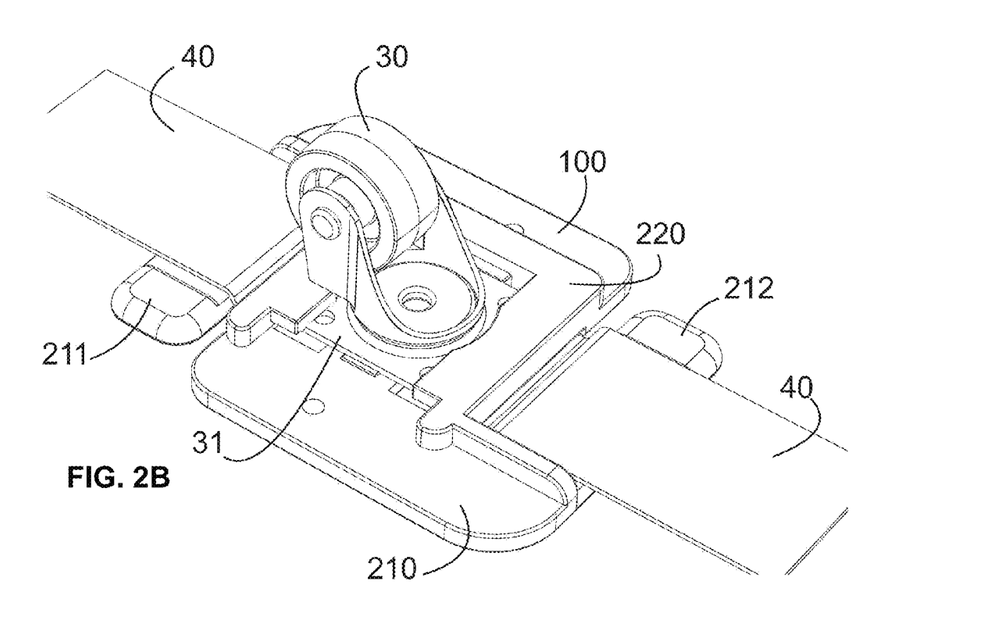
FIG. 2B shows a perspective view of the first embodiment of the present invention attached to a strap holding a wheel set.
Figure 3A:
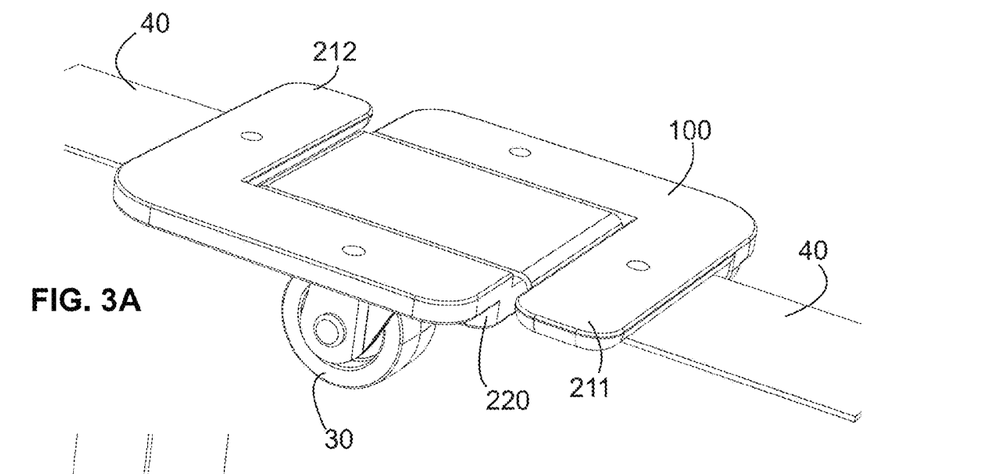
FIG. 3A shows a perspective top-side view of the first embodiment of the present invention with a strap and a wheel set.
Figure 3B:
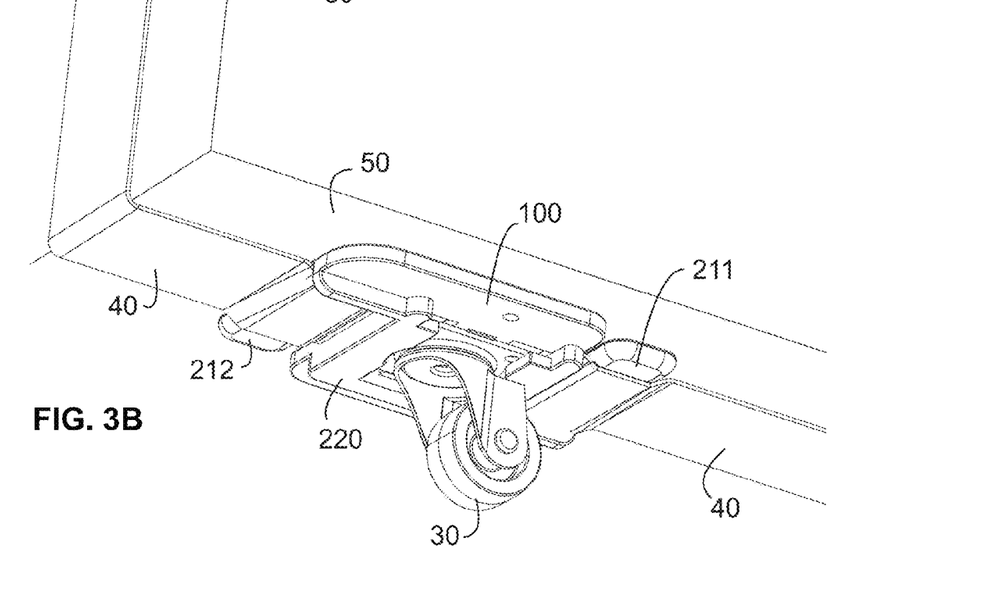
FIG. 3B shows a perspective view of the first embodiment of the present invention attached to a strap and holding a wheel set around an object.

As shown in FIGS. 2A and 2B, the coupler 100 further has two symmetrical cut-outs 18-19 for preventing the wheel-rollers to be in contact with the holder-plate 210. The cut-outs 18-19 provide the necessary space for the rotation of the wheel around the wheel-rollers. These cut-outs 18-19 enable the wheel 30 to freely swivel on the coupler 100.

As shown in FIG. 1C, for increasing the friction between the supporting plate 210 and a carrying object (not shown), the supporting plate 210 further has a slip fee surface. The slip free surface can have different roughness with different friction coefficient. By increasing the friction coefficient, the position of the holder 200 between the strap and the object can be secured.

For attaching the coupler 100 to any strap as shown in FIGS. 2A, 2B, 3A and 3B, there is no need to open the strap and pass the strap into the strap channels. The user may put the detachable coupler 100 between the strap 40 and the object 50 and navigate the wheel coupler 100 along the strap-way 213 by sliding two arms 211-212 around the strap 40.

As shown in FIGS. 2A, 2B, 3A and 3B, the position of the coupler 100 on the strap 40 can be secured by the weight of the object 50 and the strap 40 which is passed through the two L-shaped arms 211-212 which oppositely connect to the supporting plate 210.

Again as shown in FIGS. 1A, 1B, 1C, 2A, 2B, 3A and 3B, the first embodiment of the present invention is a wheel coupler 100 with or without a strap attachment to receive a wheel 30 having a mounting plate 31, said coupler 100 comprising of a plate 210 having a top side and a bottom side; the bottom side of said first plate having a wheel attachment means 220 to slidably receive the mounting plate 31 of the wheel 30; the top side of said first plate having strap receiving slots 213, whereby said coupler 100 is attached to a strap 40 by passing the strap through said slots 213 and then the wheel 30 is attached to the strap 40 through the slide rail means 220, whereby said coupler 100 is attached before or after a strap 40 is wrapped around a carryable object 50.

The second embodiment of the present invention is shown in FIGS. 4A, 4B, 4C, 5A, 5B, 6A-6E. The holder 200 comprises of two parts: a detachable supporting plate 110 and a holder-means 120. The coupler 100 comprises of a detachable supporting plate 110 having four horn-shaped apertures 113-116, and two strap-ways 111-112 and a holder-means 120 having a substantially hexagonal holder-plate 120 to form an opening 13 of rectangular shaped with two symmetrical grooves 15-16 adapted to grip the opposite sides of a wheel-plate of the wheel. A strap passes through the strap-ways 111-112 and underneath of the holder-means 120. In the second embodiment, there is no need to pass the strap through the strap channels, so attachment of the wheel holder to straps or objects is done in an easy and comfortable way.

Again as shown in FIGS. 4A, 4B, 4C, 5A, 5B, 6A-6E, the holder-means 120 further has a locking mechanism. The locking mechanism comprises of four pins 121-124 that are extended axially from the four corners of the holder-means 120 to receive four horn-shaped (or keyhole shaped) apertures 113-116 on the supporting plate 110. Pins 121-124 have a round top sized to receive a top part of the horn-shaped holes 113-116. The supporting plate 110 is secured on the holder-means 120 by turning it clockwise when the pins 121-124 enter the holes 113-116. The holder-means 120 further having three raised portion 17 at distal end of the holder and front-top of the opening 13 to grab the opposite sides of the wheel-plate. By sliding one side of the wheel-plate into the opening 13, the raised portions 17 keep the wheel-plate in a proper location and prevent it from rotation or sliding out during transportation.

As shown in FIGS. 6A-6E the detachable supporting plate 110 further has two strap-ways 111-112 perpendicular to each other with different width to be able to compensate two straps 40-41 by different widths.

The holder 200 further has two symmetrical cut-outs 18-19 for preventing the wheel-rollers to be in contact with the holder-plate 12. When the wheel rotates around the wheel-rollers, the cut-outs 18-19 provide the necessary space for rotation. By having these cut-outs 18-19, the wheel is enabled to freely swivel on the holder 200.

Figures 4A, 4B:
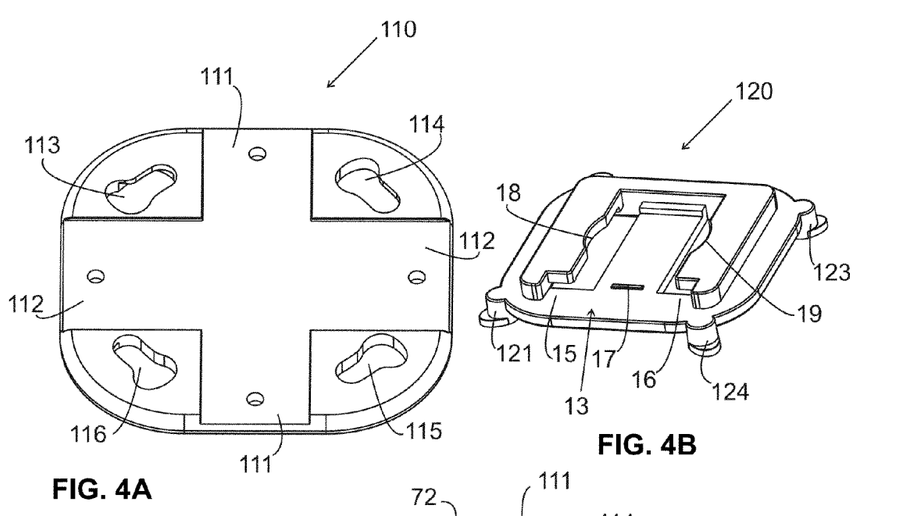
FIG. 4A shows a perspective view of top plate of the second embodiment of the present invention.
FIG. 4B shows a perspective bottom view of the supporting plate of the second embodiment of the present invention.
Figure 4C:
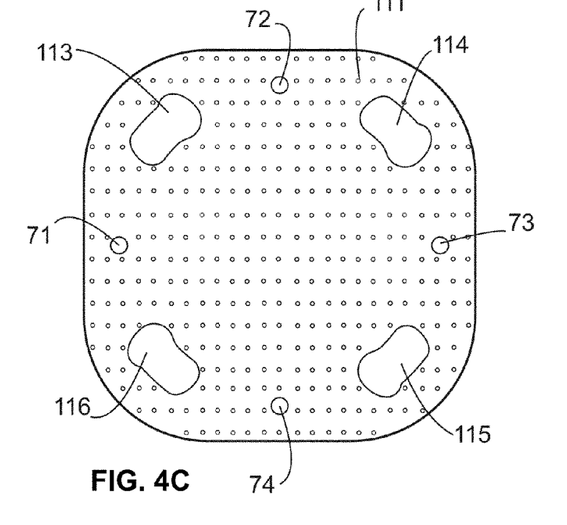
FIG. 4C shows a perspective top view of first plate of the second embodiment of the present invention.
Figure 5A:
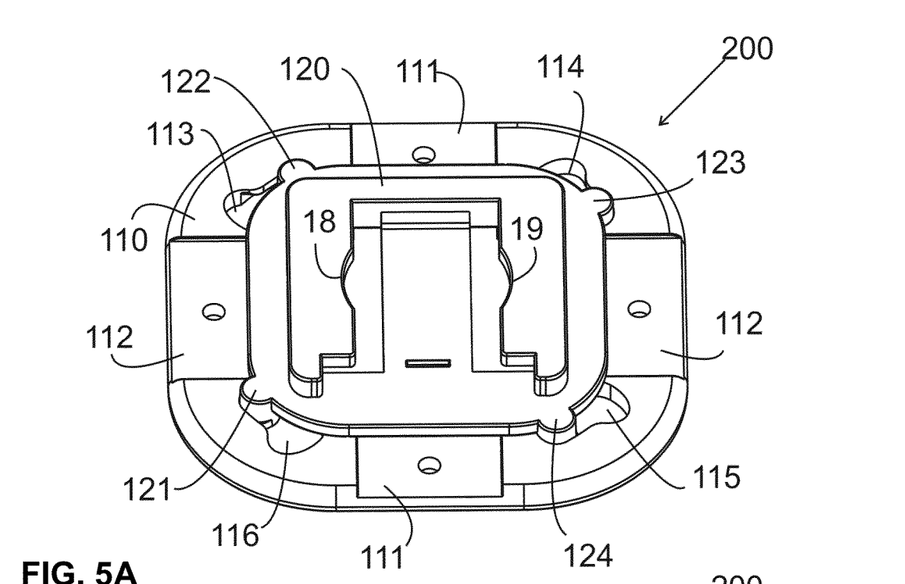
FIG. 5A shows a perspective view of the second embodiment of the present invention.
Figure 5B:
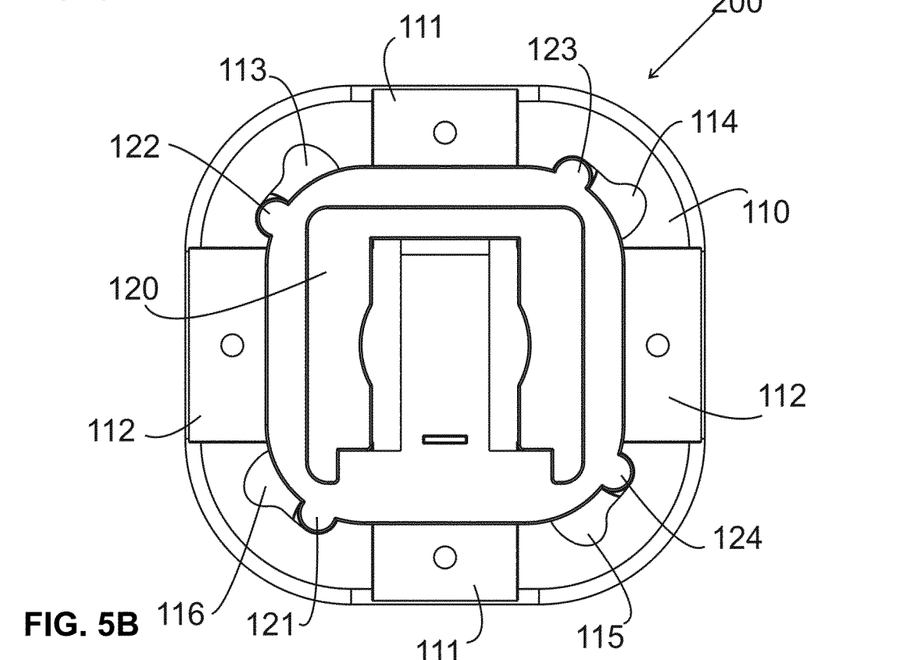
FIG. 5B shows a bottom view of the second embodiment of the present invention.
Figure 6A:
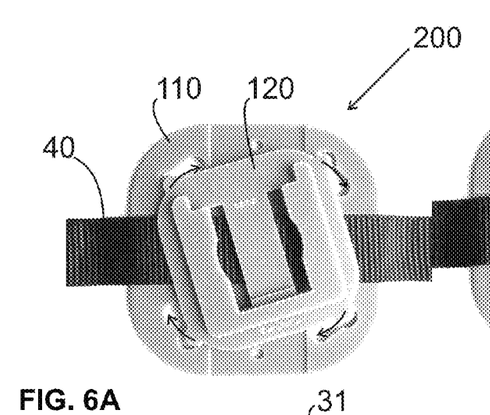
FIG. 6A shows a perspective view of the second embodiment of the present invention installed on a strap.
Figure 6B:
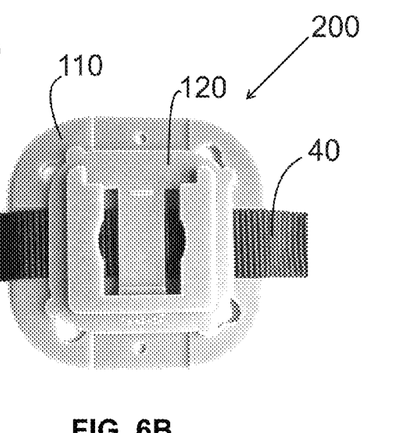
FIG. 6B shows a perspective view of the second embodiment of the present invention installed on a strap.
Figures 6C, 6D, 6E:
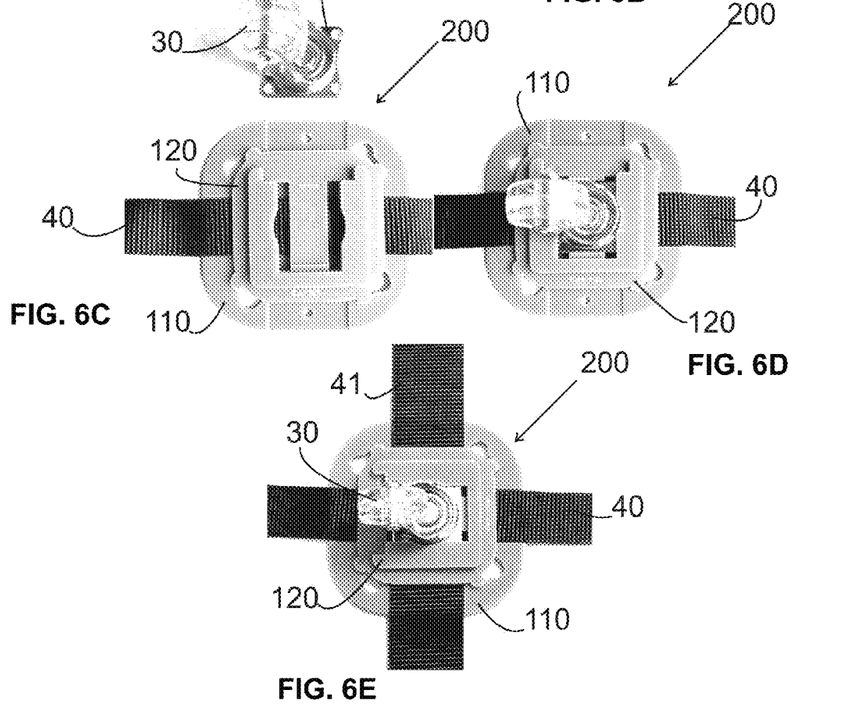
FIG. 6C shows a perspective view of the second embodiment of the present invention installed on a strap.
FIG. 6D shows a perspective view of the second embodiment of the present invention installed on a strap with a wheel set.
FIG. 6E shows a perspective view of the second embodiment of the present invention installed on two straps with a wheel set.
Figures 7A, 7B, 7C:
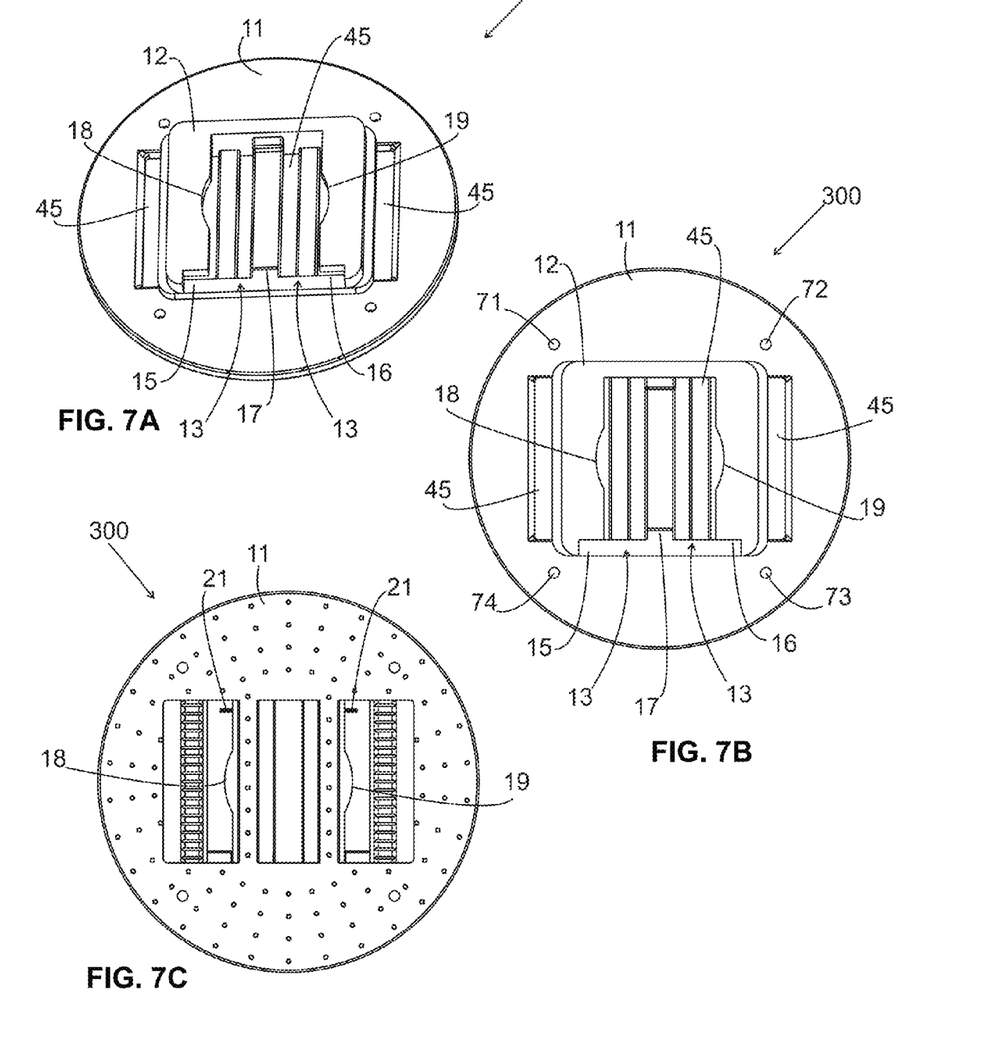
FIG. 7A shows a perspective view of the third embodiment of the present invention.
FIG. 7B shows a bottom view of the third embodiment of the present invention.
FIG. 7C shows a top view of the third embodiment of the present invention.

As shown in FIG. 4C, for increasing the friction between the supporting plate 110 and a carrying object (not shown), the supporting plate 110 further has a rough surface. The rough surface can have different roughness with different friction coefficient. By increasing the friction coefficient; the position of the holder 200 between the strap and the object can be secured.

In order to attach the holder 200 to a strap, the user may put the detachable supporting plate 110 between the strap and the object and attach the holder-means 120 to the supporting plate 110 with the clockwise locking mechanism. In this embodiment, there is no need to open the strap and pass the strap into the strap channels.

The third embodiment of the present invention is shown in FIGS. 7A-7C, 8A, 8B, 9A, 9B, 10A and 10B. The holder 300 for fixing a wheel 30 on a strap comprises of a supporting plate 11 having a substantially hexagonal holder-plate 12 to form an opening 13 of rectangular shaped with two symmetrical grooves 15-16 adapted to grip the opposite sides of a wheel-plate 31 of the wheel 30 to compensate a strap 40 in a proper location between the supporting plate 11 and the holder-plate 12.

Again as shown in FIGS. 7A-7C, 8A and 8B the holder-means 12 further has three raised portion 17, 21 and 22 at distal end of the holder and front-top of the opening 13 to grab the opposite sides of the wheel-plate 31. By sliding one side of the wheel-plate 31 into the opening 13, the raised portions 17, 21, 22 keep the wheel-plate 31 in a proper location and prevent it from rotation or sliding out during transportation.

The holder 300 is further having two symmetrical cut-outs 18-19 for preventing the wheel-rollers 32 to be in contact with the holder-plate 12. When the wheel 30 rotates around the wheel-rollers 32, the cut-outs 18-19 provide the necessary space for rotation. By having these cut-outs 18-19, the wheel 30 is enabled to freely swivel to any direction on the holder 300.

Figure 8A:
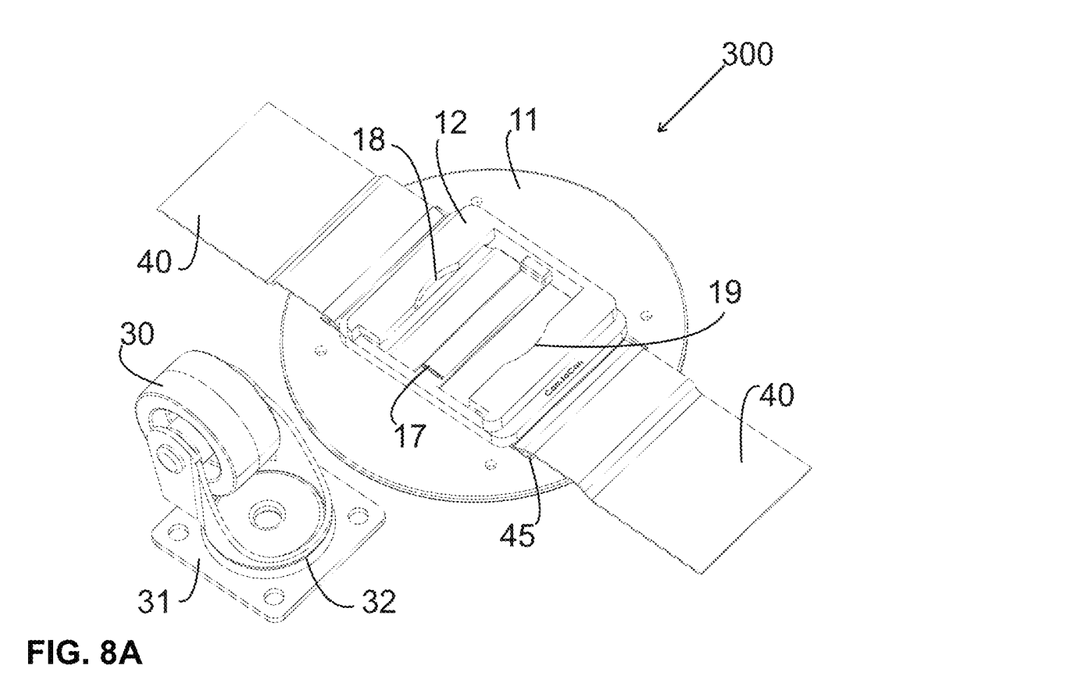
FIG. 8A shows a perspective bottom view of the third embodiment of the present invention with a strap to hold a wheel set.
Figure 8B:
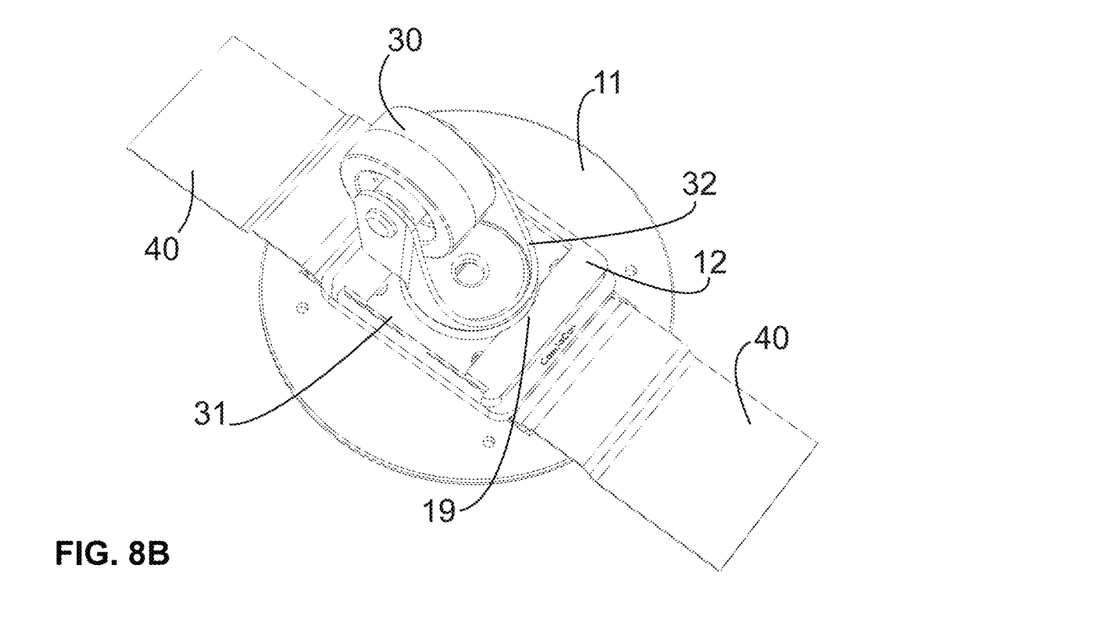
FIG. 8B shows a perspective bottom view of the third embodiment of the present invention with a strap and a wheel set.
Figure 9A:
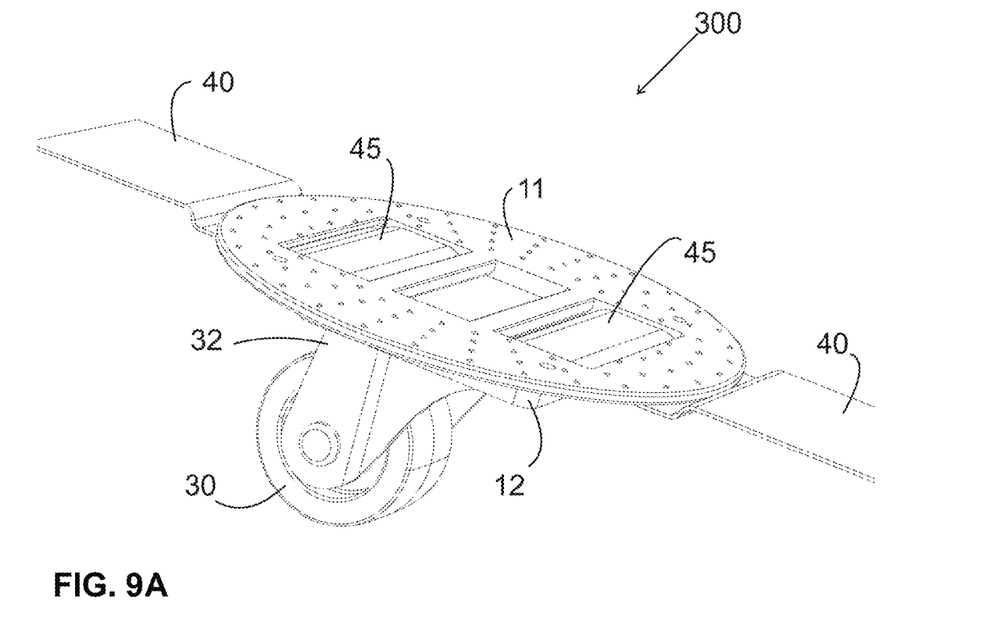
FIG. 9A shows a perspective top-side view of the third embodiment of the present invention with a strap and a wheel set.
Figure 9B:
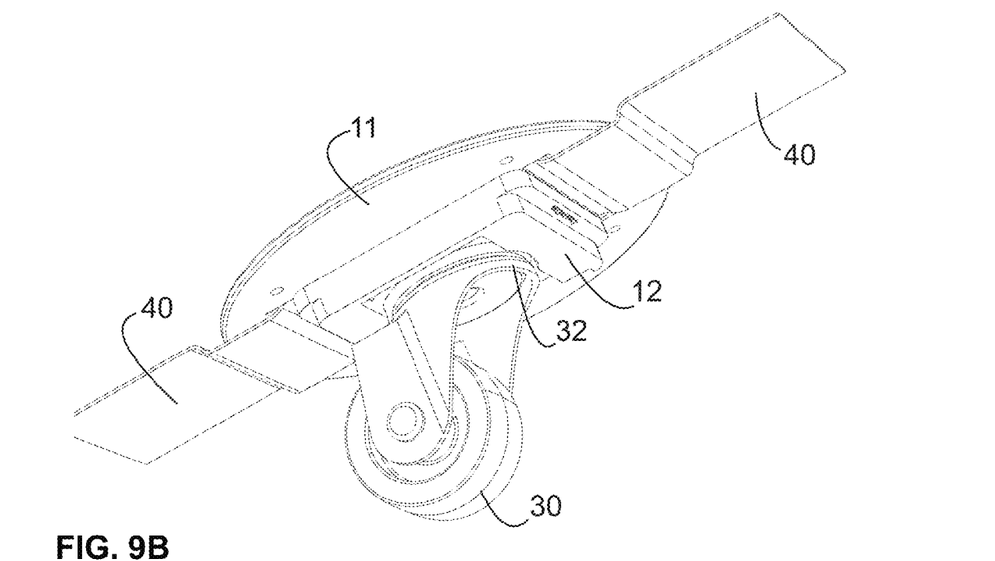
FIG. 9B shows a perspective bottom-side view of the third embodiment of the present invention with a strap and a wheel set.

FIGS. 8B, 9A and 9B show the wheel 30 with its plate 31 installed in the holder 300. The opening 13 on the holder 300 is sized to receive the wheel-plate 31 and keep it during the transportation in a stationary but detachable position based on the body of an object.

As shown in FIG. 9A, for increasing the friction between the supporting plate 11 and a carrying object (not shown), the supporting plate 11 further has a rough surface. The rough surface can have different roughness with different friction coefficient. By increasing the friction coefficient; the position of the holder 300 between the strap and the object can be secured. For attaching a strap to the holder 300, the user should pass the strap from the strap channels 45.

Figure 10A:
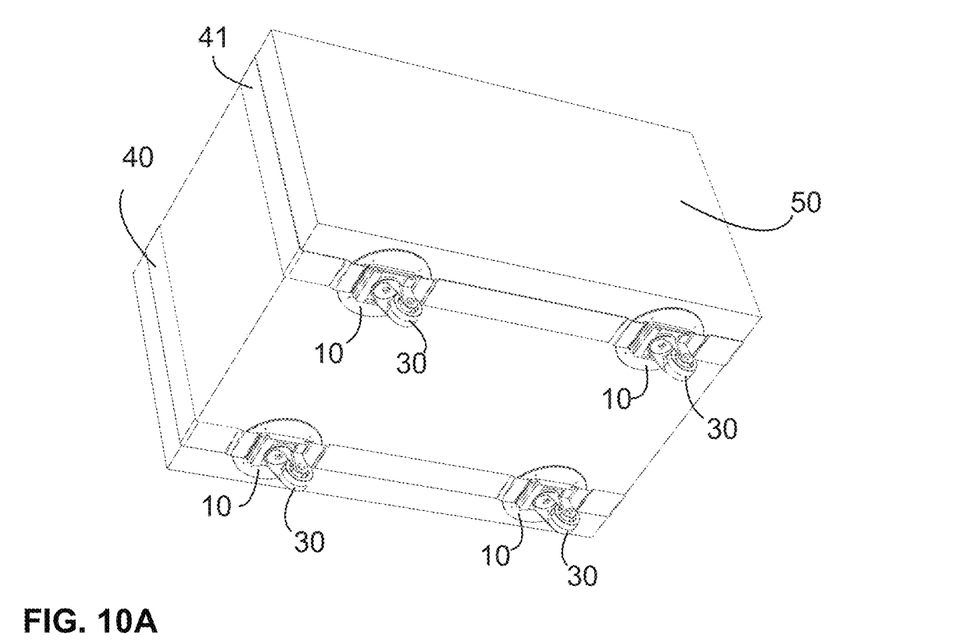
FIG. 10A shows a perspective view of the third embodiment of the present invention with a strap and a wheel set around an object.
Figure 10B:
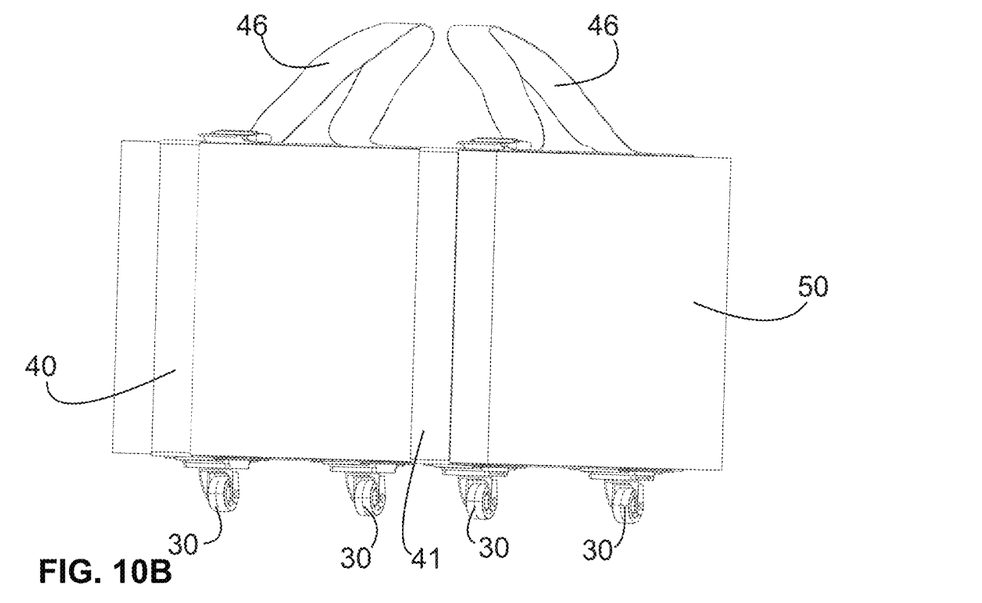
FIG. 10B shows a perspective view of the third embodiment of the present invention with a strap and a wheel set around an object.

FIGS. 10A and 10B show a carrying object 50 which has two straps 40-41 wrapped around the object 50, and each strap 40-41 has at least two sets of wheels 30. Again as shown in FIG. 10B, the straps 40-41 have a handle 46 which a user can grab on to carry the object 50. The handles 46 can be attached to different locations on the straps 40-41 based on the size, length and height of the object 50. The wheel 30 with its plate 31 is conveniently detached from the holder 10 by simply pushing it out from the opening 13. By having two straps, which secure the wheel sets, and a rough surface on the top portion of the supporting plate, the wheel set retains a stationary position on the surface of the object and does not slide on the surface.

As shown in all FIGs, the holders 100, 200 and 300 further having a plurality of apertures 71-74 which may use them for fixing the holders 100, 200 and 300 to the carrying object by a plurality of self-penetrating screws through designated apertures 71-74. It makes the present invention independent from any strap.

In another embodiment of the present invention, the supporting plate and the holder-means can be attached to each other by a plurality of strong magnets embedded inside their body to keep them in a proper location or it can be fixed by two or four screws through screw holes.

The present invention can be made of different materials such as plastics, composites, wood, or various metals (Aluminium and alloys).

In another embodiment of the present invention, the supporting plate can be made of a magnetic material to be able to attach to a metallic object or material.

The supporting plate can be affixed to the object by four screws, bolts and nuts. The other possibility to affix the supporting plate to the object is to apply adhesive materials to the contacting surface and attach it to the surface.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A wheel attachment device and a coupler to attach a wheel that has a mounting plate to a carryable object that has a strap, said coupler comprising:
   a. a wheel attachment plate having two parallel grooves sized to slidably receive the mounting plate of the wheel, said wheel attachment plate having a first side and a second side;
   b. a strap attaching means to attach to the strap comprising:
      i. a first L-shaped arm connected to said first side forming a first groove between the first side and one leg of said first arm; and
      ii. a second L-shaped arm connected to said second side forming a second groove between the second side and one leg of said second arm, wherein said first and said second grooves are symmetrical and adapted to grip the opposite sides of the mounting plate,
   whereby said first and said second arms slide under the strap that is already tightly attached to a carryable object and the mounting plate slides into said grooves, thereby said coupler couples said wheel with said strap.

2. The wheel attachment device and the coupler of claim 1, wherein each said first and second L-shaped arms further have a recess to form a strap-way and to prevent the strap from slipping off the coupler.

3. The wheel attachment device and the coupler of claim 1, wherein each said first and second grooves further having a cut-out to allow said wheel to freely rotate in place without contacting the grooves.

4. The wheel attachment device and the coupler of claim 1, wherein said coupler having a top surface that is in contact with the carryable object, wherein said top surface having an anti-slip means to increase the friction between the coupler and carryable object so that the coupler does not slide over the strap.

5. The wheel attachment device and the coupler of claim 1, wherein said coupler further having plurality of apertures to attach said coupler with a set of screw means directly to the carryable object without a strap, whereby said coupler couples said wheel with said carryable object.

* * * * *